United States Patent
Brock (10) Patent No.: US 9,420,519 B2
(45) Date of Patent: Aug. 16, 2016

(54) NETWORK ELEMENTS, WIRELESS COMMUNICATION SYSTEM AND METHODS THEREFOR

(71) Applicant: IP.Access Limited, Cambridge (GB)

(72) Inventor: David Brock, Cambridge (GB)

(73) Assignee: IP.Acccess Limited, Cambridge (GB)

(*) Notice: Subject to any disclaimer, the term of this patent is extended or adjusted under 35 U.S.C. 154(b) by 0 days.

(21) Appl. No.: 14/437,335

(22) PCT Filed: Oct. 4, 2013

(86) PCT No.: PCT/EP2013/070737
§ 371 (c)(1),
(2) Date: Apr. 21, 2015

(87) PCT Pub. No.: WO2014/063913
PCT Pub. Date: May 1, 2014

(65) Prior Publication Data
US 2015/0319726 A1    Nov. 5, 2015

(30) Foreign Application Priority Data

Oct. 22, 2012  (GB) .................................. 1218900.7

(51) Int. Cl.
*H04W 60/00* (2009.01)
*H04W 48/02* (2009.01)
(Continued)

(52) U.S. Cl.
CPC .............. *H04W 48/02* (2013.01); *H04W 60/00* (2013.01); *H04W 64/003* (2013.01); *H04W 84/105* (2013.01); *H04W 84/045* (2013.01)

(58) Field of Classification Search
CPC ... H04W 48/02; H04W 60/00; H04W 84/045; H04W 84/105; H04W 64/003; H04W 4/02

USPC .......... 455/435.1, 456.1, 456.2, 456.3, 456.4, 455/456.5, 456.6, 457, 404.2, 432.1

See application file for complete search history.

(56) References Cited

U.S. PATENT DOCUMENTS 8,611,887 B1 * 12/2013 Okmyanskiy ......... H04W 4/001
370/328
2008/0081636 A1    4/2008 Nylander
(Continued)

FOREIGN PATENT DOCUMENTS

EP    2083586 A1    7/2009
EP    2112854 A1    10/2009
(Continued)

OTHER PUBLICATIONS

Maria Gorlatova et al: "Managing location privacy in cellular networks with femtocell deployments":, Modeling and Optimization in Mobile, Ad Hoc and Wireless Networks (WIOPT), 2011 Internatioinal Symposium on, IEEE, May 9, 2011, pp. 418-422, XP031949757, DOI: 978-1-61284-822-8 paragraph [0111]; Figure 1.

(Continued)

*Primary Examiner* — Kamran Afshar
*Assistant Examiner* — Farid Seyedvosoghi
(74) *Attorney, Agent, or Firm* — Optimus Patatents US, LLC (57) ABSTRACT

A method and apparatus for periodically assigning new, unique Location Area Codes to each cell comprising a femtocell network (100-111) permits a user equipment to perform a re-registration attempt with the same cell after a short period of time has elapsed in cases where an initial attempt to register was rejected. The invention is particularly useful for location presence services as a location presence signal may be generated every time a User Equipment (113) attempts to register on a cell (100) whether or not the attempt was successful.

20 Claims, 3 Drawing Sheets

(51) Int. Cl.
*H04W 64/00* (2009.01)
*H04W 84/10* (2009.01)
*H04W 84/04* (2009.01)

(56) References Cited

U.S. PATENT DOCUMENTS

| | | | |
|---|---|---|---|
| 2008/0207170 A1* | 8/2008 | Khetawat | H04W 60/005 455/411 |
| 2010/0075658 A1* | 3/2010 | Hou | H04W 48/02 455/422.1 |
| 2012/0077493 A1 | 3/2012 | Robbins | |
| 2012/0088482 A1* | 4/2012 | Pazhyannur | H04W 24/04 455/418 |

FOREIGN PATENT DOCUMENTS

| | | |
|---|---|---|
| EP | 2120491 A1 | 11/2009 |
| FR | 2925999 A1 | 7/2009 |
| WO | 2013/016585 A1 | 1/2013 |

OTHER PUBLICATIONS

Huawei: "Iu-based 3G HNB Architecture", 3GPP Draft; R3-081166 IU-Based 3G HNB Architecture, 3rd Generation Partnership Project (3GPP), Mobile Competence Centre; 650, Route des Lucioles; F-06921 Sophia-Antipolis Cedex; France, vol. ran wg3, no. Kansas City, USA; Apr. 30, 2008, XP050164359, [retrieved on Apr. 30, 2008] paragraph [04.2].

* cited by examiner

NETWORK ELEMENTS, WIRELESS COMMUNICATION SYSTEM AND METHODS THEREFOR

FIELD OF THE INVENTION

The field of this invention relates to network elements, a wireless communication system and methods for operating a cellular communication system and has particular applicability to providing a location presence service in such a system.

BACKGROUND

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilize high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Tub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by a 2G or 3G Radio Access Network (RAN) and circuit switched (CS) domain network. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN. Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB) or Evolved Home Node B (eHNB) defined by 3GPP to identify femtocell Access Points. Each small-cell is supported by a single Access Point. These small cells are intended to augment the wide area macro network and support communications to multiple User Equipment devices in a restricted, for example, indoor environment. Such small cells are intended to be able to be deployed "underneath" a macrocell (in a multi-layer structure, for example) in order to support communications to UEs in a restricted area such as a shopping mall, for example. An additional benefit of small cells is that they can offload traffic from the macro network, thereby freeing up valuable macro network resources). One or more Access Points are linked to a Core Network through an Access Controller. An Access Controller which links one or more HNB's to the Core Network is known as a Home Node B Gateway (HNB-GW). An HNB provides a radio access network connectivity to a user equipment (UE) using the so-called Iuh interface to a HNB-GW.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467. Herein, the term "small cell" means any cell having a small coverage area and includes "picocells" and "femtocells."

Often in a small cell network, an Access Point Management System (AMS) is provided which may communicate with each Access Point and/or the Access Controller (HNB-GW). This management system is typically configured to manage a large number of Access Points, for example, monitoring, software upgrades, failure management and informing each Access Point of its assigned Location Area Code (or Routing Area Code). A Location Area Code (LAC) is a specific field in a Local Area Identifier which uniquely distinguishes one Location Area from others which are serviced by the same Mobile Switching Centre (MSC) of the Core Network. Some small cell systems employ a two-tiered LAC allocation scheme in order to maximize the number of supported small cells with distinct LAC's yet make the entire small cell system transparent to the core network (see for example US-A-20080207170).

When a User Equipment (UE) camps on to a particular HNB, for example, the HNB attempts to register the UE with the HNB-GW by sending a HNBAP UE register request message. The message can contain a UE identity and will be acknowledged with an accepted message if the registration is successful. The HNB broadcasts its assigned LAC which the UE detects and subsequently acknowledges that it is now operating in in that Location Area by sending a "Location Update" message. The HNB may monitor the UE via the periodic location updates. If a number of location updates are missed, the HNB assumes that the UE is no longer camped on and has left the HNB's' area of coverage. The HNB then informs the HNB-GW of this occurrence by sending a HNBAP deregister message.

A current industry model is to implement a GSMA one API on one of three places: viz. on the User Equipment (for handset applications) or on the small cell (for local applications) or on the application Gateway (for external third-party access). The GSMA one API is an application programming interface which has been developed by the GSM (Global System for Mobile Communications) Association. It is intended to be a web service interface. An application developed with one API can obtain information across network operators that support it. It is intended for operation on servers and mobile devices and the first API's to be implemented will be for messaging and location functions. Specifically, version 1 requires "location presence" capability and the ability to send and receive short message services (SMS) and multimedia messaging services (MMS) through the application Gateway using the GSMA one API.

"Presence" services in general permit an individual and equipment which he/she uses for communication to share information on the state of the individual and that equipment. Such information can include whether the individual and his communication equipment are currently able to communicate with others or are engaged on a video call, for example. "Presence" can also include information relating to the location of a user's communication equipment. A "presence server" may be provided in such instances for, on detection that a particular UE has entered a particular location, enabling applications that subscribe to a "presence" service to take some form of action. For example, location information can be very useful to retailers and advertisers who may wish to communicate with shoppers who are known to be in a certain location at a certain time, a shopping mall for example.

Some current Location Presence services are based on the use of a localised Identity Request sent by an Access Point to a UE to obtain its IMSI International Mobile Subscriber Identifier). This was originally proposed to support a form of access control. If the Access Point is prepared to offer normal telecommunications services, then the UE is allowed to register on the small cell. Alternatively, the IMSI may be captured from the so-called "Common_ID" sent by the Core network. In each case an Access Point must have a different LAC/RAC from the surrounding coverage (ie. other small cells or overlapping macrocell) in order to prompt a Registration attempt when camping on. A registration attempt may be used to prompt a location presence trigger. (See Applicant's co-pending Application GB 1209224.3).

In summary, current Location Presence services provide detection of a permitted user camping on an Access Point (or HNB). At this point a Registration will also be sent to the Core Network. This covers the scenarios of open access cells where all users are accepted for service; and the permitted user group of a closed access HNB.

In some circumstances (e.g. for traffic capacity reasons) it may be desirable for an AP to reject the UE so that it returns to the macro network. Two commonly-understood methods for achieving this are "LU (Location Update) Reject" (or, more generally, Registration Reject) or "Authentication Failure". The latter method is not generally preferred as behavior varies across UEs and different 3GPP releases. A UE may also be rejected if it is not authorized to receive services from a particular Access Point ie. where there is Closed Access Control. Typically, the UE holds a "reject list" of LAC's from which it has been rejected. The capacity of this list is typically 10 LAC's. These stored LAC's are discarded on a cyclic first-in-first-out basis when the list reaches full capacity.

A further feature of the registration reject method is that a rejected UE is configured to delay trying to access an Access Point, having an LAC which is recorded in the reject list, for a lengthy period (typically 12-24 hours or the UE power-cycle). This is generally an advantage for Closed Access Control, but a disadvantage for a Location Presence service, as the UE will be prevented from re-accessing the same cell or from accessing another cell using the same LAC for a long period. Therefore, using known techniques, only UE's which are accepted on a cell and offered services can repeatedly re-register on a cell with the same LAC and so be detected again by a location presence service.

SUMMARY OF THE INVENTION

Aspects of the invention provide network elements, a wireless communication system and methods therefor as described in the appended claims.

According to a first aspect of invention there is provided a method for operating a cellular communication system comprising a plurality of neighbouring small cells, each of said plurality of neighbouring small cells supporting communications between a wireless communication unit and a core network, the method comprising; assigning an initial, unique area code to each small cell, and periodically assigning a new, unique area code to each small cell.

In one embodiment, the area codes are changed after expiry of a configurable, pre-determined time interval.

In another embodiment, the area codes are changed after variable time intervals which may be determined based on system usage.

In a preferred embodiment, the method may be modified in order to provide a location presence service in the cellular communication system by performing the further step of receiving, at a first of said small cells, a request for registration of a wireless communication unit with the core network, said request including an identity of the wireless communication unit, and on receipt of the request, notifying a location presence server of the presence of the wireless communication unit in the cell and of the identity of the wireless communication unit.

The method may also include notifying the location presence server when the wireless communication unit has left the coverage area of a cell.

Each unique area code may be a Location Area Code or a Routing Area Code.

An Iu area code may also be assigned to an Access Controller which controls each Access Point associated with each small cell.

The identity of the wireless communication unit may comprise its IMSI (international mobile subscriber Identifier).

The wireless communication unit's request for registration may be accepted or rejected. In either case a location presence notification is generated and location presence server is notified.

In a preferred embodiment, all registration requests are rejected. Then, by regularly changing area codes for each small cell, a rejected UE will be able to attempt to re-access an Access Point from which it has previously been rejected. This permits more location presence service detections within a given time interval.

A wireless communication unit's request for registration may be accepted. In such cases, the area code currently assigned to the small cell receiving the request may be replaced with an Iu area code for onward transmission to the core network. Further (accepted) requests for registration from the wireless communication unit as it moves between small cells may be handled "locally" by the small cell network in order to minimise traffic to and from the core network. A method for such local handling of registrations is described in Applicant's co-pending application GB 1219180.5.

If there are many wireless communication units receiving services within the network of small cells at any one time, the changes to the area codes may be delayed until fewer (or no) wireless communication units are receiving services so that the units in service are not forced to re-register each time an area code is changed, thereby increasing communications traffic loading.

As, typically, a UE holds only a limited-sized list of Local Area Codes from which it has been rejected (typically 10) the invention permits a large population of Access Points to be served by a relatively small number of LAC's.

According to a second aspect of the invention, there is provided an apparatus for a cellular communication system, the system comprising a plurality of neighbouring small cells, each of said plurality of neighbouring small cells supporting communications between a wireless communication unit and a core network, wherein the apparatus includes one or more network elements arranged to assign an initial unique area code to each small cell, and to periodically assign a new, unique area code to each small cell.

The apparatus may further include one or more network elements adapted to receive a request for registration of a wireless communication unit with a small cell, said request including an identity of the wireless communication unit and to generate a location presence message including data relating to the location of the first cell and the identity of the wireless communication unit, and a location presence server for receiving said location presence message and for storing said data.

The network elements may be implemented in one or more integrated circuits.

In one example, each small cell is served by an HNB which may receive a registration request and an IMSI from a UE. Since a registration attempt is, in itself, sufficient to provide location presence detection, all UE's can be rejected from a cell and there is no need to offer telecommunications services through the HNB. Further, the rejection process occurs entirely within the small cell/HNB network, ie. the Core Network is oblivious to the request and so there is no increase in Core Network signalling as a result of the location presence detection of a rejected UE.

Hence in a preferred embodiment, the apparatus includes one or more network elements which are configured to reject the request for registration. This permits an Access Point to be provided with lower nominal capacity than is conventional. Further, such an Access Point does not require the usual high bandwidth links to its Access Controller (HNB-GW, for example) as it will not need to provide any voice or data services.

Advantageously, HNB's may be placed at locations where a location presence service is desired, eg. different areas of a shopping mall or large retail store. Conventionally, any UE registration access/registration request results in a localised Identity Request being sent by the HNB to obtain the UE's IMSI. Receipt of this registration request and IMSI is used to generate a location presence notification.

According to a third aspect of the invention there is provided a wireless communication system including the apparatus of the above aspects.

According to a fourth aspect of the invention, there is provided tangible computer program product having an executable computer program code stored thereon for execution by a processor to perform a method in accordance with the above aspects.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

These and other aspects, features and advantages of the invention will be apparent from, and elucidated with reference to, the embodiments described hereinafter.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to network elements, wireless communication system and method therefor. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the examples described are merely illustrative of some embodiments and that the teachings set forth herein are applicable in a variety of alternative settings. For example, since the inventive concepts do not depend on any particular combination of radio access technologies, it is envisaged that the inventive concepts can be applied to other combinations of RAT's although 3G systems are shown in the embodiments. As such, other alternative implementations within cellular communication systems conforming to different standards are contemplated and are within the scope of the various teachings described.

Figure 1:
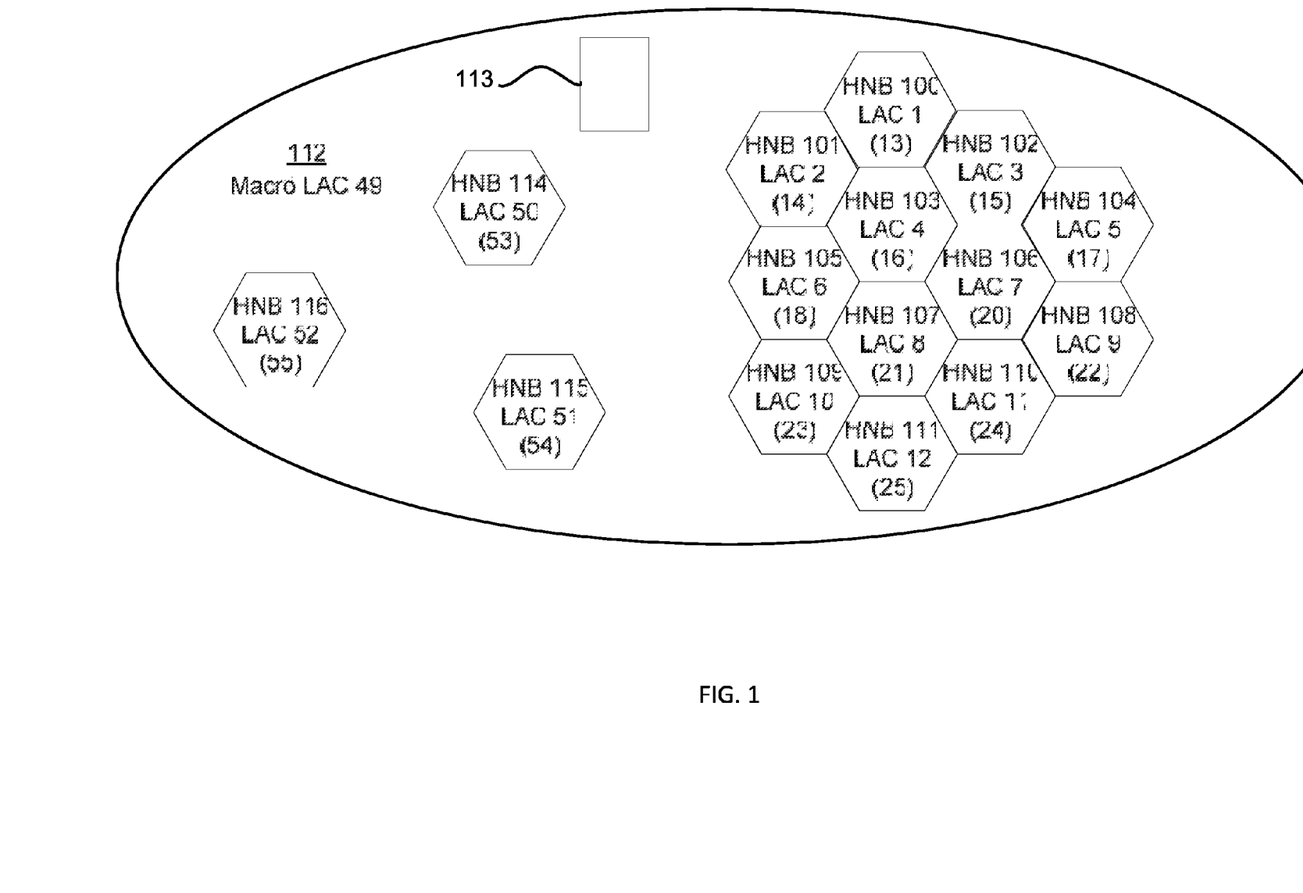
FIG. 1 illustrates an example of an arrangement of cells comprising a cellular communication system in accordance with an example embodiment.

Referring now to FIG. 1, a plurality of neighboring small cells, each served by an Access Point which, in this example, comprise Home Node B's (HNB) 100-111 are clustered within a part of the coverage area of a macrocell 112. A further three, isolated small cells served by HNB's 14, 15 and 16 are also located within the coverage area of the macrocell 112 and are distanced from one another and from the cluster of small cells 100-111 The small cells 100-116 and the macrocell 112 all serve to support communications between a User Equipment 113 and a Core Network via a single Mobile Switching Centre. The small cells 100-116 may serve offices and/or a large retail area such as a shopping mall. The area covered by the macrocell 112 is assigned a Location Area Code (LAC) 49. The HNB's 100-111 are assigned initial unique LAC's from 1 to 12 respectively and the HNB's 114-116 are assigned initial unique LAC's 50-52. An Iu LAC is assigned to the HNB-GW. So each HNB has a LAC which is different from its neighbours and also different from the macrocell LAC (and also from the Iu LAC which represents the Iu link between the HNB-GW and the Core Network 203. After a predetermined time period the LAC's of each of the small cells 100-116 are changed to new unique values. In FIG. 1 these new values are shown in parentheses and in respect of the HNB's 100-111, the new assigned LACs are 13 to 25 and the HNB's 14-16 are assigned new unique LAC's 53-55. The Location Area Codes assigned to the small cells 100-116 are "on the air" (OTA) LAC's. A User Equipment 113 may move in and out of the coverage areas of each HNB 100-116. A commercial enterprise (not shown) may be interested in knowing where the UE is at any particular time and also the UE's identity (its IMSI for example) so that it may send advertising material to the UE which relates to a retail outlet which may be in its vicinity at the time. By receiving a location presence message indicating that a particular UE has requested registration with a particular small cell, and from knowledge of the geographical layout of the small cells, an estimate of the general location of the UE location may be made.

The OTA LAC's of the HNBs are arranged so that as the UE 113 moves from one small cell's coverage area to another it sees a different LAC. This prompts a registration request with the HNB serving the cell which the UE 113 has just entered. This registration request is used to trigger a location presence notification message.

Figure 2:
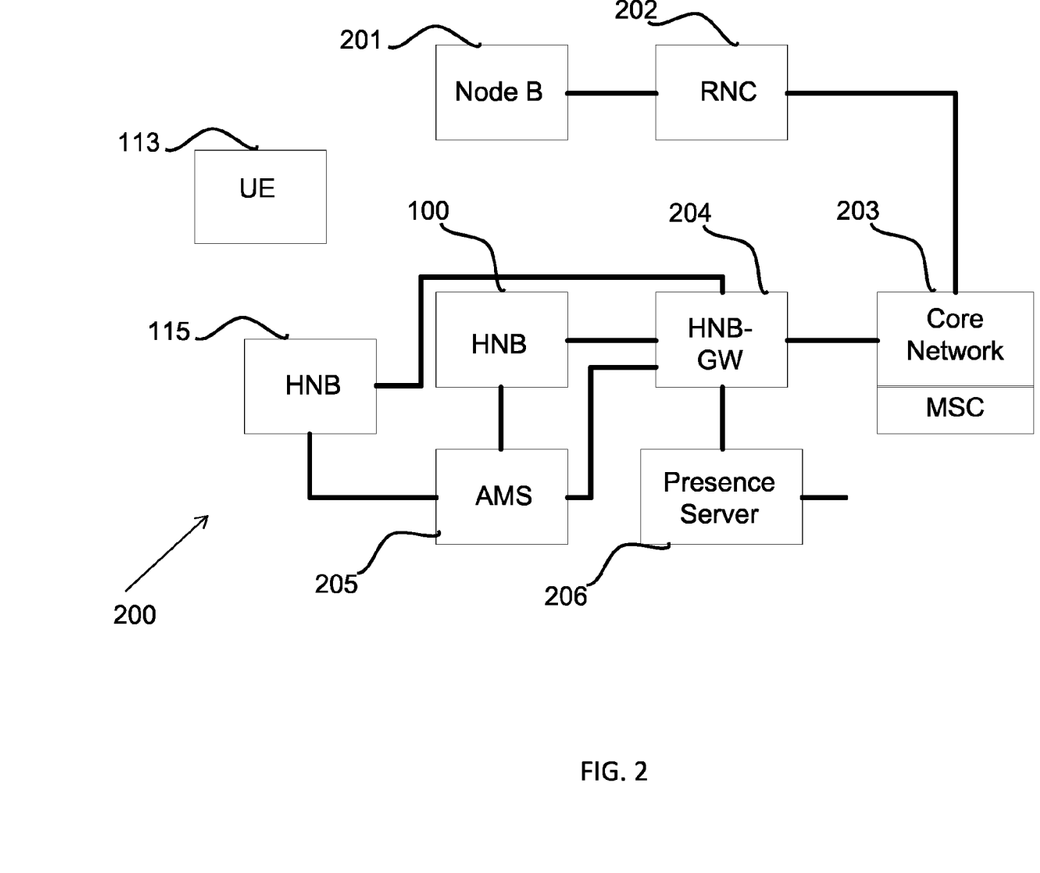
FIG. 2 illustrates a part of a cellular communication system operating in accordance with an example embodiment.

Referring now to FIG. 2, an example of part of a 3G wireless communication system operating in accordance with embodiments of the invention is illustrated and indicated generally at 200 and comprises a Node B 201 which supports wireless communications in the macrocell 112. The Node B 201 is connected with a radio network controller (RNC) 202 which in turn is linked with a Core Network 203 which includes a Mobile Switching Centre and other conventional network elements or subsystems (not shown)

The plurality of HNB's represented in FIG. 1 although only two 100, 115 are shown in FIG. 2 for the sake of clarity, are linked to the Mobile Switching Centre (MSC) through an Access Controller, which in this example is a Home Node B Gateway (HNB-GW) 204. An Access Point Management System (AMS) 205 is connected to the HNB-GW 204 and each HNB. A presence server 206 is also connected with the HNB-GW 204. A User Equipment 113 may roam in and out of the coverage areas of the node B 201 or the HNB's 100-116 and request access to the Core Network through any one of these nodes. The HNB-GW 204 provides Presence Indications to the Presence Server 206 which offers a Presence API to presence-based applications which may be subscribed to by a commercial enterprise.

The MSC of the Core Network 203 routes services for both the small cell and macrocell networks of FIG. 1. A UE 113, roaming between a coverage area of the macrocell 112 network and the coverage areas of the small cell network, will utilise the same MSC of the Core Network 103. The MSC is aware that the LAC for the area covered by the macrocell 112 is LAC 49.

Initially the Core Network 203 allocates a set of LAC's to the AMS 205. These are available for use as OTA LAC's and for at least one Iu LAC. The AMS 205 then decides which of the allocated OTA LAC's to assign, initially, to each HNB 100-111. Each HNB 100-111 is informed of its OTA LAC and of the Iu LAC. The AMS 205 also decides which new LAC's to assign to each HNB 100-116 and when to make this change. The AMS 205 may be arranged to change the LAC's after a preset period of time. Alternatively, the AMS 205 may be configured with an algorithm for changing the LAC's at variable time periods depending on communications traffic patterns such as network loading or usage history.

The AMS 205 is therefore configured to monitor the traffic on the small cell networks and also keeps a list identifying those UE's which are authorised to access each HNB 100-116.

The HNB-GW 204 is configured to generate a location presence notification message and send this to the presence server 206 each time it receives a registration request from a UE 113 via any one of the HNB's 100-116 to which it is linked.

In an alternative embodiment, the AMS 205 generates the location presence notification message and sends it to the presence server 206 on receiving a trigger from the HNB-GW 204 indicating that a UE 113 has requested registration via one of the HNB's 100-116.

In either case, the location presence notification message contains information relating to the identity of the UE 113 (eg. its IMSI) and the identity of the HNB which received the initial request for registration. The cell identity may be its OTA LAC or some other identifier derived from this. The presence server 206 may map an HNB identifier to a geographic location or some other identifier useful to presence applications.

Figure 3:
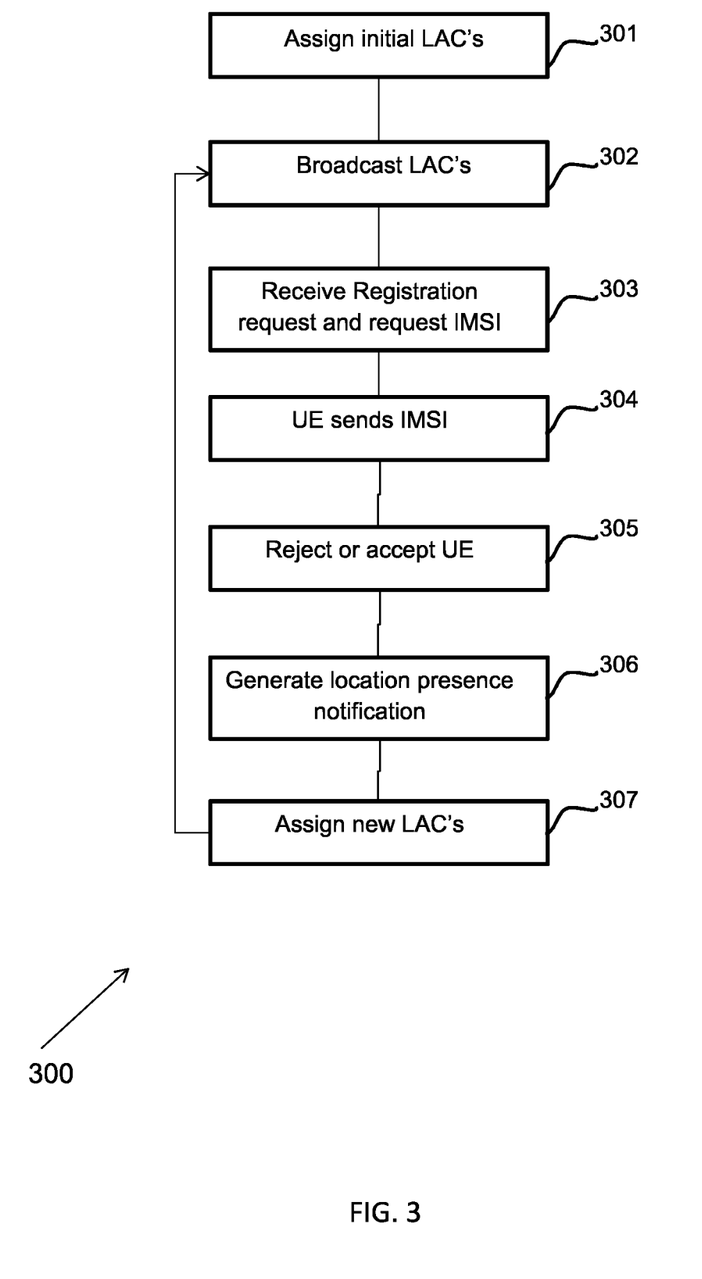
FIG. 3 is a flow chart of an example of a method for providing a location presence service.

An example of a method 300 for providing a location presence service will now be described with reference to the simplified flow diagram of FIG. 3.

At 301 each HNB 100-116 is assigned an initial, unique LAC.

At 302, each HNB 100-116 broadcasts its assigned LAC which is received by any UE within its coverage area.

In a first example, say that the UE 113 moves into the coverage area of the HNB 100 which serves one of a cluster of cells covering a large retail area. On entering the coverage area of HNB 100, the UE 113 will record the broadcast LAC 1 and acknowledge that it is now operating within a new location area and initiate a Registration Request to the HNB 100 by performing a location update.

At 303 the HNB 100 receives the Registration Request and in response sends an Identity Request to the UE 113.

At 304 the UE 113 responds by sending the HNB 100 its IMSI which the HNB forwards (with the location update) to the HNB-GW 204.

At 305 a decision is taken as to whether to reject or accept the UE. In a preferred embodiment, all UE's are rejected and no registration request is forwarded to the Core Network. However, as the HNB-GW 204 has received a registration request and has the IMSI of the UE 113 it is able at 306, to generate a location presence notification to the presence server 206. Alternatively, the AMS 205 may check its authorisation list to see if a UE with the particular IMSI which the HNB-GW 204 has received is authorised to receive services from the particular HNB 100. In this example, the AMS 205 confirms that this particular UE is authorised. However, the AMS 205 is aware that the small cell network is currently heavily loaded and therefore decides to reject the UE 113 (which may respond by "camping on" to the macrocell 112 instead). Hence, the AMS 205 sends an instruction to the HNB-GW 204 which, in turn, instructs the HNB 100 to reject the UE 113.

However, as the HNB-GW 204 has received a registration request and has the IMSI of the UE 113 it is able at 306, to generate a location presence notification to the presence server 206. Therefore, even though the UE did not successfully register with the Core Network 203 via HNB 100, a commercial enterprise subscribing to the location presence service has still been informed that the UE is currently in the vicinity of HNB 100.

As the UE 113 has been rejected from a cell having LAC 1, the UE 113 stores this LAC in its reject list. As is conventional, the UE 113 will not attempt to register on any cell having this LAC (ie. 1) for a relatively long period of time, typically, 24 hours. However, with the exception of HNB 100, this drawback is overcome as the AMS 205 has ensured that all LAC's in the small cell network (100-116) are unique. In order to permit the UE 113 to attempt to register with HNB 100 again, any time, at 307, the AMS 205 assigns each HNB 100-116 controlled by the HNB-GW 204 a new, unique LAC. This change may be done periodically, say every 10 minutes. Alternatively, it may be done more or less frequently or at varying time intervals depending on network operating factors and network loading.

The method then reverts to 302 where each HNB 100-116 broadcasts its new LAC.

In a second example, say that the UAE 113 moves into the area of coverage of HNB 15 having an initially assigned LAC of 51. As in the first example, it sends a registration request to the HNB 115 which, in response, requests the UE's IMSI. The IMSI is conveyed to the AMS 205 via the HNB-GW 204. Again in the preferred embodiment, the UE is rejected at this point. However, alternatively, the AMS 205 may again be configured to consult its authorisation list to discover, in another example, that this particular UE 113 is not authorised to receive services from this particular HNB 115 which, in this example serves offices rather than a retail area. Therefore the UE 113 is rejected and the LAC 51 is stored in the UE's reject list. However, once again the registration request triggers the generation of a location presence notification in the HNB-GW 204. The notification is received by the presence server 206 and may be used by a commercial enterprise subscribing to such a location presence service. When the AMS 205 assigns a new LAC 54 to the HNB 115, the UE will be able to attempt registration again with this HNB.

Hence the invention permits an Access Point to act as a collector of User Equipments' IMSI's for location presence services even if the Access Point does not actually provide a service for that particular User Equipment.

In cases where the UE 113 is accepted by the HNB that it requests registration with, the HNB-GW 204 follows the conventional procedures for enabling the UE to communicate with the Core Network 203 and also sends a location presence notification to the presence server 206. The LAC sent to the Core Network 203 with the registration request may be the LAC currently assigned to the HNB or it may be the Iu LAC which is substituted for the OTA LAC by the HNB-GW prior to forwarding the registration request.

In an alternative embodiment the algorithm for determining when to make the changes to the LAC's is configured in the HNB-GW 204 rather than the AMS 205.

In another embodiment, each HNB 100-116 is provided with a list of LAC's that it may use and a time schedule for making the changes.

While the invention has been described with respect to LACs, it will be apparent to one of ordinary skill in the art that some embodiments may perform a similar form of location presence service when the assigned area codes are Routing Area Codes rather than LAC's. This alternative of using Routing Area Codes is viable when a UE has an active data service and registers in the packet switched (PS) domain. In this case, registrations are exchanged with an SGSN (Serving GPRS (general packet radio system) Support Node) rather than an MSC. In the case of combined registration for circuit switched and packet switched domains the registrations are exchanged with the SGSN.

The signal processing functionality of the embodiments of the invention, particularly those functions performed by the HNB's 100-116. HNB-GW 204 and AMS 205 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other subsystem element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for operating a location presence service in a cellular communication system comprising a plurality of neighbouring small cells, each of said plurality of neighbouring small cells supporting communications between a wireless communication unit and a core network, the method comprising:
assigning an initial unique area code to each small-cell; and
periodically, after a short period of time has elapsed, assigning a new unique area code to each small-cell thereby increasing a number of location presence service detections.

2. The method of claim 1, including; receiving, at a first of said small cells, a request for registration of a wireless communication unit with the core network, said request including an identity of the wireless communication unit and on receipt of the request, notifying a location presence server of the presence of the wireless communication unit in the first cell and of the identity of the wireless communication unit.

3. The method of claim 2, including rejecting said request for registration.

4. The method of claim 2, including accepting said request for registration and replacing the unique area code of the first cell with an Iu area code in the request for registration and forwarding the request for registration to the core network.

5. The method of claim 1, wherein the area codes are changed after expiry of a configurable pre-determined time interval.

6. The method of claim 1, wherein the area codes are changed after variable time intervals which are determined based on wireless communication system usage.

7. The method of claim 1, wherein each unique area code is a Location Area Code.

8. The method of claim 1, wherein each unique area code is a Routing Area Code.

9. The method of claim 1, wherein the identity of the wireless communication unit is an IMSI (International Mobile Subscriber Identifier).

10. An apparatus for supporting location presence service in a cellular communication system, the system comprising a plurality of neighbouring small cells, each of said plurality of neighbouring small cells supporting communications between a wireless communication unit and a core network, wherein the apparatus includes one or more network elements arranged to: assign an initial unique area code to each small cell and to periodically, after a short period of time has elapsed, assign a new, unique area code to each small cell thereby increasing a number of location presence service detections.

11. The apparatus of claim 10, further comprising one or more network elements for receiving a request for registration of a wireless communication unit with a first small cell, said request including an identity of the wireless communication unit, and for generating a location presence message including data relating to the location of the first cell and the identity of the wireless communication unit, and a location presence server for receiving said location presence message and for storing said data.

12. The apparatus of claim 11, comprising one or more network elements arranged to reject said request for registration.

13. The apparatus of claim 11, comprising one or more elements arranged to accept said request for registration and to replace the unique area code of the first cell with an Iu area code in the request for registration and to forward the request for registration to the core network.

14. The apparatus of claim 10, wherein the network elements are implemented in one or more integrated circuits.

15. A non-transitory computer readable medium having an executable computer program code stored thereon for execution by a processor to perform a method in accordance with claim 1.

16. A non-transitory computer readable medium of claim 15, comprising at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

17. The method of claim 1, wherein the new unique area code is periodically assigned to each small-cell in a short time of a few minutes.

18. The apparatus of claim 10, wherein the new unique area code is periodically assigned to each small-cell in a short time of a few minutes.

19. The method of claim 1, further comprising performing by a user equipment a successful registration attempt with the same cell using the new unique area code after a short period of time where an initial attempt to register was rejected.

20. The apparatus of claim 10, wherein the new unique area code assigned after a short period of time enables a user equipment to perform a successful registration attempt with the same cell following an initial attempt to register being rejected.

* * * * *